May 19, 1931.  L. T. WARD  1,806,228
VENETIAN BLIND
Filed Feb. 9, 1931   3 Sheets-Sheet 1
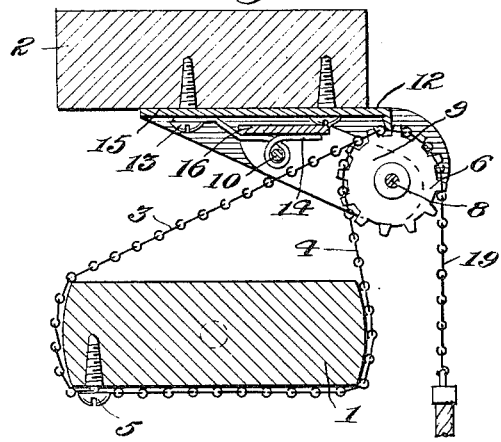
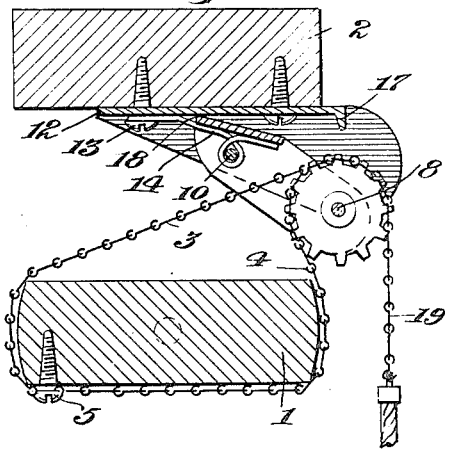
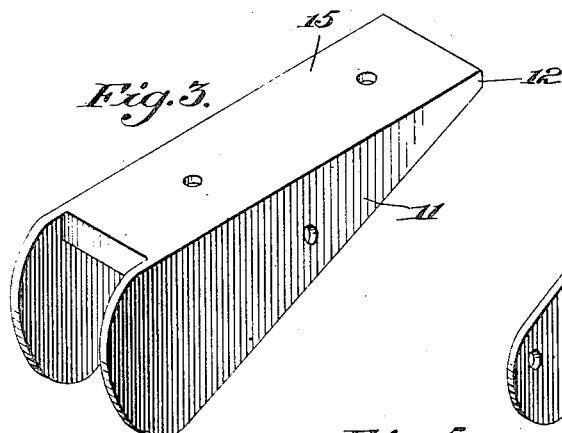
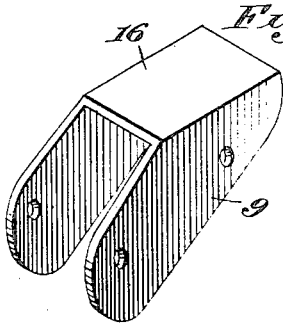
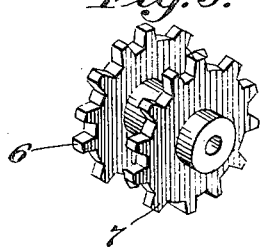
Inventor:
Lawrence T. Ward,
Raymond Jones
Att'y.

May 19, 1931.  L. T. WARD  1,806,228
VENETIAN BLIND
Filed Feb. 9, 1931  3 Sheets-Sheet 2
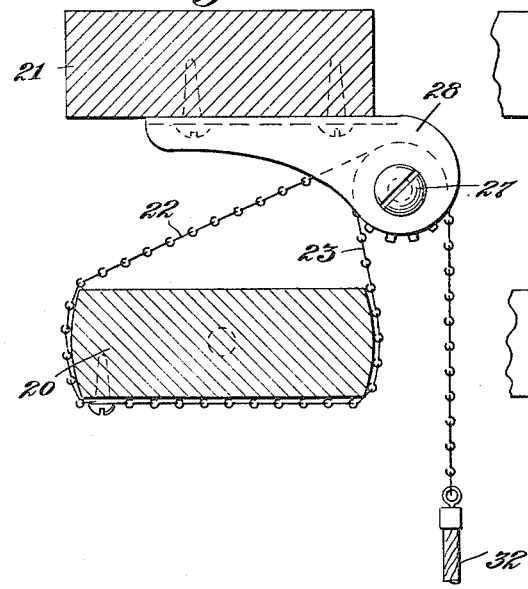
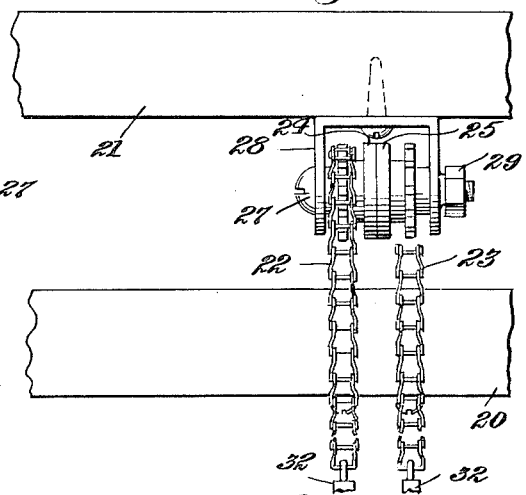
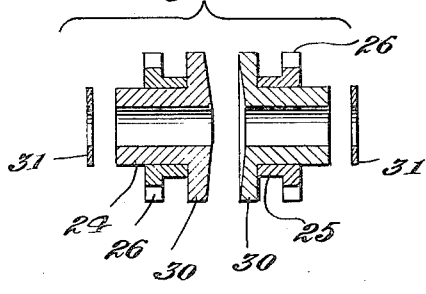
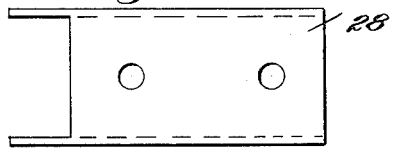
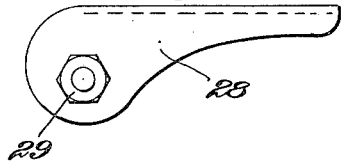
Inventor:
Lawrence T. Ward,

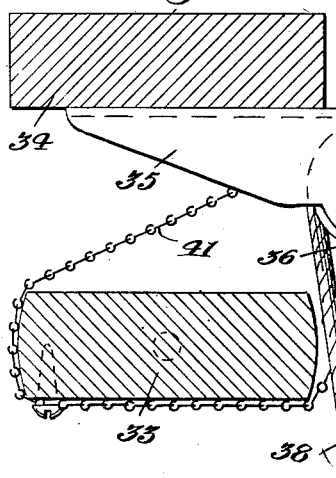
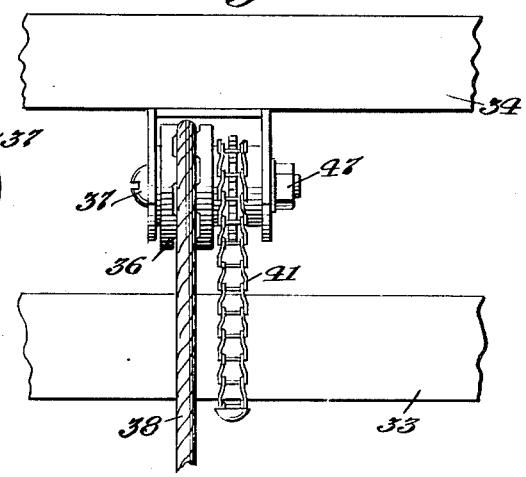
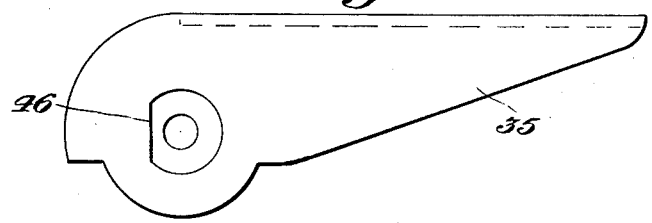
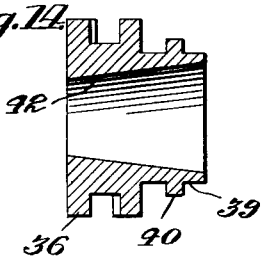
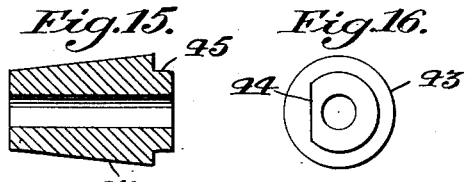
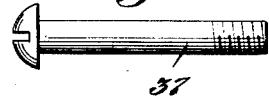

Patented May 19, 1931

1,806,228

UNITED STATES PATENT OFFICE

LAWRENCE THOMAS WARD, OF KANE, PENNSYLVANIA, ASSIGNOR TO KANE MANUFACTURING COMPANY, OF KANE, PENNSYLVANIA, A CORPORATION OF PENNSYLVANIA

VENETIAN BLIND

Application filed February 9, 1931. Serial No. 514,643.

My invention relates to Venetian blinds, and more particularly to a device which functions to hold or lock the tilting bar of a Venetian blind in any position to which it may be adjusted by its operator and which is arranged to be positively controlled by the means employed to operate the bar.

In the constructions heretofore proposed and used to retain the usual tilting bar in adjusted positions, the locks or holding devices have been wholly or partially supported directly upon the bar. Such devices as now found in the prior art, comprise a multiplicity of parts which are not only expensive to construct, but also difficult and laborious to install, as well as to maintain in satisfactory operation.

According to my invention, the holding means is entirely supported upon a fixed member adjacent to or displaced from the tilting bar and the locking action is effective directly upon the bar controls and, at the same time, indirectly upon the bar. My improved holding device, furthermore, is associated with the main operating cable for the bar in such a manner as to be directly operable by any movement of the cable during adjustments of the bar.

The principal object of my invention, therefore, is to provide a holding device for the tilting bar of a Venetian blind which is entirely supported upon a fixed member remote from the bar, and which is effective to securely lock the bar in any adjusted position.

Another object is to provide a locking device which is comprised of a minimum of parts, which is economical to manufacture and which is simple to install and effective in operation.

A further object is to provide a locking device for a tilting bar which cooperates directly with the bar control members to lock the bar in any desired position.

These and other objects will become apparent from the specification which follows and from the drawings wherein,—

Figure 1 is a view in side elevation, partly in section, of my improved operator showing the parts in a locked position;

Fig. 2 is a somewhat similar view but showing the parts in an unlocked position;

Figs. 3, 4, and 5 are detail views;

Figs. 6 and 7 are end and side views, respectively, of a modified form of operator;

Figs. 8, 9 and 10 are detail views of parts shown in Fig. 6;

Figs. 11 and 12 are end and side views, respectively, of still another modification; and Figs. 13 to 17 are detail views of parts shown in Fig. 11.

Referring to the drawings in detail, a pivotally supported tilting bar 1 is shown as associated with a head rail 2 in the usual manner for such devices. The operating or tilting means for the bar 1 comprises, in its preferred form, chain sections 3 and 4, the free ends of which are attached as at 5 to the opposite front and rear edges of the bar 1 and at a point adjacent one end of the bar. The chain sections engage, respectively, spaced sprocket wheels 6 and 7 which are formed integral with each other and which wheels are rotatably mounted by means of a pin axle 8 on the forward or free end of a tilting member 9. The member 9 in turn is pivotally mounted by means of a pin 10 upon and within the side walls 11 of a housing 12. The housing 12 is firmly attached to the underside of the rail 2 by means such as screws 13. A coil spring 14 is shown as mounted to encircle the pin 10 and engages with its free ends respectively against the transverse wall portions 15 and 16 of the housing 12 and tilting member 9. The spring 14 normally functions to rotate the member 9 counterclockwise to maintain the latter in its extreme upper position. The transverse portion 15 of the housing 12 is provided at its forward end with a downturned edge portion 17 so located as to occupy a position above the sprocket wheels 6 and 7 and in line with the pin axle 8. When the sprocket wheels are in their raised position, the locking edge portion 17 will engage between the teeth of the wheels, thereby locking the latter against rotation.

It will be noted in Fig. 1 that the transverse wall portions 15 and 16 are spaced from each other vertically whereby, when the member 9 is tilted in a clockwise direction, as shown in Fig. 2, the rear end 18 of the wall 16 will engage the underside of the wall 15 and serve as a stop to further rotation of the member 9.

During operation of the bar 1, a downward pull on either extension 19 of the chains 3 and 4 will cause the sprocket wheels 6 and 7 to move to their extreme lower position as shown in Fig. 2, in which position the wheels become disengaged from the locking edge 17, thereby permitting a free rotation of the wheels.

While I have shown sprocket wheels and chains as a preferred form of an operator, it is to be understood that I may employ a pulley provided with grooves to receive operating cords, in which case the pulley would be provided with a plurality of peripherally spaced teeth as shown in Fig. 12, and arranged to interlock with the edge 17.

Figs. 6 to 10 show a modification of my improved bar operator, which is similar generically to the device above described, but includes specifically a friction type of lock. The tilting bar 20 is supported rotatably in relation to the head rail 21 and is shown to be operated by a pair of chain sections 22 and 23 in a manner similar to the device of Fig. 1.

The friction lock comprises a pair of sprocket wheels 24 and 25 adapted to engage by means of their teeth 26, the respective chains 22 and 23. The sprocket wheels are rotatably mounted on a bolt 27 between the side walls of a housing 28 which, in turn, is rigidly mounted on the head rail 21. A nut 29 is threadably engaged with the end of bolt 27. It will be noted that each sprocket wheel is provided with an integral friction disc 30 and the adjacent contacting faces of these discs may be formed slightly convex and concave respectively. The degree of friction between the friction discs is adjustable by means of the nut 29 which may be taken up, more or less, to force the friction discs together. A friction washer 31 is arranged adjacent each wheel 24—25.

In the operation of tilting the bar 20, one or the other of the chain sections 22 or 23 may be pulled by means of the usual cord loop 32. A pull on the chain 22 will impart a clockwise rotation to the bar 20 and the corresponding sprocket wheel 24. At the same time, the other chain 23 will be tensioned by the rotating bar and will be pulled over its sprocket wheel 25, thereby rotating the latter in a counterclockwise direction, or opposite to the rotation of the wheel 24. The frictional contact between the discs 30 is effective at all times to retain or lock the tilting bar 20 in any adjusted position.

Referring to Figures 11 to 17, which show a modified form of a friction lock, the tilting bar 33 is associated with a head rail 34. A pulley support or bracket 35 is firmly attached to the underside of the head rail 34 and carries a grooved pulley 36 by means of a bolt axle 37. The pulley is adapted to be rotated by means of an operating cable loop 38 which engages the groove in the pulley. A sprocket hub 39 is formed integrally with the pulley and is provided with a plurality of teeth 40 which engage with a chain loop 41 attached at the free ends thereof to the bar 33. A tapered bore 42 is formed axially in the pulley 36. A friction sleeve 43 which is cut on the same taper as that of the bore 42, is arranged to frictionally engage the bore 42. The sleeve is provided with a lateral flat portion 44 formed on an extension 45 and the flat portion 44 engages a corresponding flat portion 46 on the housing 35 which provides a means to prevent the sleeve 43 from turning upon the bolt 37 when the pulley 36 and sprocket 39 are rotated by the cable 38. The friction between the pulley bore 42 and the sleeve 39 may be varied by adjustment of the nut 47 which threadably engages the bolt 37 and rotation of the nut 47 acts to force the sleeve 43 more or less within the bore 42. The frictional engagement between the sleeve and pulley is effective to lock the bar 33 in any position to which it may be adjusted by operation of the cable 38 and pulley 36.

In the operation of the several modifications described, when it is desired to vary the position of the tilting bar and the angular position of the slats suspended therefrom, a pull is imparted upon the main operating loop or cable, and the retaining action of the detent is immediately rendered ineffective upon the bar. A continued pull upon the cable in a desired direction thereafter serves to adjust the tilting bar to a desired position. As soon as the pulling action is stopped, the locking action is again applied to the bar and the cable. It will be noted that my improved lock in all forms comprises elements which are assembled to form a single compact unit which may be mounted upon a fixed support displaced from the tilting bar in a position to be operatively associated with the control members closely adjacent to the tilting bar. The lock is characterized by its simplicity, effectiveness and facility for installation or replacement.

The prior art locking devices that are supported partly on the head rail and partly on the tilting bar are expensive to construct and install and require a predetermined exact spacing between the rail and the bar at all times and in most instances require certain modifications in the tilting bar itself and variations from a standard form of bar. Such constructions do not afford continuous effective operation and result in numerous failures. Locking devices constructed according to my invention are adapted for application to any existing type of blind without modification of any elements thereof, except as to a slight variation in the operating members.

While I have shown and described preferred and modified forms of my invention, it is to be understood that other modifications thereof are contemplated within the scope of the claims which follow.

What I claim is:

1. In a Venetian blind in combination, a tilt bar, a fixed supporting member associated with said bar and displaced therefrom, flexible operating means connected to said bar, locking means for said bar operatively associated with said flexible means, and means for supporting said locking means wholly upon said supporting member and free of said tilt bar.

2. In a Venetian blind in combination, a tilt bar, a head rail associated with said tilt bar and displaced therefrom, a locking roller rotatably mounted on said head rail, a detent for said roller mounted on said head rail, a flexible member connected to said tilt bar and operable to rotate said tilt bar, said flexible member being operatively engaged with said locking roller, whereby said flexible member and tilt bar may be retained in any position of adjustment.

3. In a Venetian blind in combination, a tilt bar, a head rail associated with said tilt bar, a flexible member connected to said tilt bar and operable to rotate the latter, a roller and a detent therefor wholly supported on said head rail, said roller engaging said flexible member and directly operable upon said member to retain said member and said tilt bar in any position of adjustment.

4. In a Venetian blind in combination, a tilt bar, a head rail associated with said tilt bar and displaced therefrom, a roller and a detent for said roller wholly supported on said head rail, a flexible member connected to said bar and operable to rotate the latter, said flexible member being operatively engaged with said roller normally to be detained thereby, whereby said flexible member and tilt bar may be retained in any position of adjustment.

5. In a Venetian blind in combination, a tilt bar, a fixed support adjacent said bar, a roller, a roller supporting frame, said roller being mounted on said frame, said frame being mounted on said support to permit said roller to move towards and away from said support, detent means on said support for engaging said roller in one position, a flexible member connected to said bar and engaging said roller whereby a pull on said member is effective to disengage said roller from said detent means.

6. In a Venetian blind in combination, a tilt bar, a fixed support adjacent said bar, a roller, a roller supporting member on said fixed support, said roller being mounted on said member means mounted on said member and frictionally engaging said roller to provide a detent for said roller, a flexible member connected to said bar and engaging said roller, whereby a pull on said flexible member is effective to rotate said bar and said roller against the friction of said detent.

7. In a Venetian blind in combination, a tilt bar, a fixed support adjacent said bar, a roller, a roller supporting member on said fixed support, said roller being mounted on said member, means mounted on said member and releasably engaging said roller to provide a detent for said roller, a flexible member connected to said bar and engaging said roller, whereby a pull on said flexible member is effective to rotate said bar and roller against the action of said detent.

8. In a Venetian blind in combination, a tilt bar, a fixed support adjacent said bar, a pair of rollers mounted on said support, said rollers being in frictional engagement with each other, flexible members connected to said bar and respectively engaging said rollers, whereby a pull on one of said flexible members is effective to rotate an associated roller and said bar.

9. In a Venetian blind in combination, a tilt bar, a fixed support adjacent said bar, a pair of rollers mounted on said support, said rollers being in frictional engagement with each other, flexible members connected to said bar at opposite edges thereof respectively, each flexible member engaging one of said rollers, whereby a pull on one of said flexible members is effective to rotate an associated roller and said bar in one direction, the rotation of said bar simultaneously rotating the other roller in an opposite direction by an opposite movement of said other flexible member.

In testimony whereof I affix my signature.

LAWRENCE THOMAS WARD.